(12) United States Patent
Varma et al.

(10) Patent No.: US 9,037,840 B2
(45) Date of Patent: May 19, 2015

(54) MECHANISM TO PROVIDE WORKLOAD AND CONFIGURATION-AWARE DETERMINISTIC PERFORMANCE FOR MICROPROCESSORS

(75) Inventors: Ankush Varma, Hillsboro, OR (US);
Krishnakanth V. Sistla, Beaverton, OR (US); Martin T. Rowland, Beaverton, OR (US); Chris Poirier, Fort Collins, CO (US); Eric J. Dehaemer, Shrewsbury, MA (US); Avinash N. Ananthakrishnan, Hillsboro, OR (US); Jeremy J. Shrall, Portland, OR (US); Xiuting C. Man, Portland, OR (US); Stephen H. Gunther, Portland, OR (US); Krishna K. Rangan, Hudson, MA (US); Devadatta V. Bodas, Federal Way, WA (US); Don Soltis, Windsor, CO (US); Hang T. Nguyen, Tempe, AZ (US); Cyprian W. Woo, Blaine, WA (US); Thi Dang, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 13/538,546

(22) Filed: Jun. 29, 2012

(65) Prior Publication Data

US 2014/0006761 A1    Jan. 2, 2014

(51) Int. Cl.
G06F 15/177 (2006.01)
G06F 1/00 (2006.01)
G06F 1/32 (2006.01)
G06F 1/20 (2006.01)

(52) U.S. Cl.
CPC .............. *G06F 1/3243* (2013.01); *G06F 1/206* (2013.01); *Y02B 60/1239* (2013.01)

(58) Field of Classification Search
USPC ............................................................ 713/1
See application file for complete search history.

(56) References Cited

U.S. PATENT DOCUMENTS

| 5,109,503 | A | * | 4/1992 | Cruickshank et al. | 703/24 |
|---|---|---|---|---|---|
| 5,781,793 | A | * | 7/1998 | Larvoire et al. | 712/37 |
| 6,711,526 | B2 | * | 3/2004 | Cooper | 702/186 |
| 6,823,516 | B1 | * | 11/2004 | Cooper | 718/108 |
| 7,174,471 | B2 | * | 2/2007 | Komarla et al. | 713/320 |
| 7,610,497 | B2 | * | 10/2009 | Lin et al. | 713/320 |
| 8,060,766 | B2 | * | 11/2011 | Konstadinidis et al. | 713/322 |
| 8,301,742 | B2 | * | 10/2012 | Hanson et al. | 709/223 |
| 2002/0087897 | A1 | | 7/2002 | Cline et al. | |
| 2011/0035611 | A1 | | 2/2011 | Brey et al. | |

(Continued)

FOREIGN PATENT DOCUMENTS

EP    2234326    9/2010

OTHER PUBLICATIONS

PCT International Search Report for PCT Counterpart Application No. PCT/US2013/047620, 5 pgs., (Oct. 10, 2013).

(Continued)

*Primary Examiner* — Suresh Suryawanshi
(74) *Attorney, Agent, or Firm* — Blakely, Sokoloff, Taylor & Zafman LLP

(57) ABSTRACT

An apparatus that includes a semiconductor chip having a processor and an on-die non-volatile storage resource is described. The on-die non volatile storage is to store different, appropriate performance related information for different configurations and/or usage cases of the processor for a same performance state of the processor.

20 Claims, 4 Drawing Sheets

(56) References Cited

U.S. PATENT DOCUMENTS

2011/0252251 A1  10/2011  De Cecare et al.
2013/0061064 A1   3/2013  Ananthakrishnan et al.
2013/0283019 A1* 10/2013  Ould-Ahmed-Vall
                          et al. ............................ 712/225

OTHER PUBLICATIONS

PCT Written Opinion of the International Searching Authorithy for PCT Counterpart Application No. PCT/US2013/047620, 8 pgs. (Oct. 10, 2013).

* cited by examiner

MECHANISM TO PROVIDE WORKLOAD AND CONFIGURATION-AWARE DETERMINISTIC PERFORMANCE FOR MICROPROCESSORS

TECHNICAL FIELD

The present invention is directed to computing systems generally, and, a mechanism for providing enhanced per die per performance state information.

BACKGROUND ART

Advanced Configuration and Power Interface (ACPI) is a body of power management software, typically integrated with or integrated to work closely with, an operating system (OS) of a computer. ACPI provides for the definition of "performance states", e.g., P0 through P5, that define performance levels of an operating (as opposed to sleeping) computer system. Each performance state typically defines a specific operating frequency of the computing system's underlying processor. As is known in the art, the performance level (and power consumption) of a processor correlates with its operating frequency. Essentially, the faster a processor operates, the more work it can do in a specific time period (higher performance level) and the more power it consumes.

Typically, a system manufacturer integrates a computer's ACPI software and processor together and defines the specific performance states for the processor through the BIOS firmware of the system. That is, definitions of the specific ACPI performance states together with the corresponding processor frequency of each performance state are stored in BIOS firmware. During boot-up of the system, the performance state information is read from BIOS firmware. During operation of the computer, the ACPI power management software uses the information to cause appropriate performance state transitions by issuing commands that change the processor's frequency.

Typically, the ACPI power management software monitors the workload of the processor. If the workload becomes extremely heavy, the ACPI power management software will issue a command that causes the processor to switch to its highest supported operating frequency/performance state (e.g., P0). If the workload becomes very light but not non-existent, the ACPI power management software will issue a command that causes the processor to switch to the lowest frequency at which it can still execute application software (e.g., P5).

BRIEF DESCRIPTION OF THE DRAWINGS

The present invention is illustrated by way of example and not limitation in the figures of the accompanying drawings, in which like references indicate similar elements and in which.

DESCRIPTION OF THE EMBODIMENTS

Figure 1:
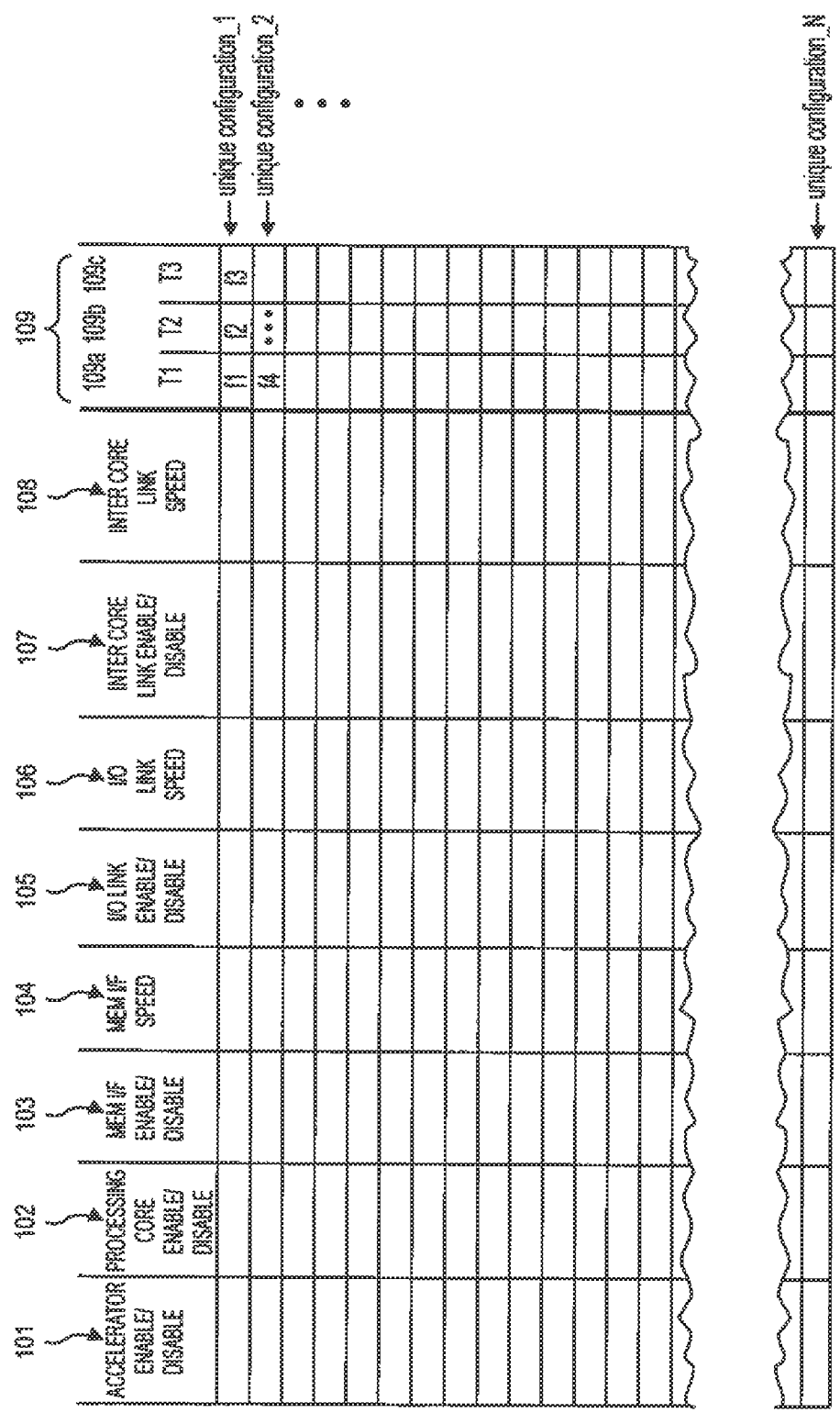
FIG. 1 shows an exemplary table of information concerning various appropriate frequencies for a same performance state that may stored in on die ROM.

The two highest ACPI performance states of a computing system, P0 and P1 (where P0 is a higher performance state than P1), are presently implemented in a manner that makes accurate and refined power consumption control difficult. Specifically, as presently implemented, the frequency of the P1 performance state is physically stamped on the processor. The P1 frequency that is stamped on the device corresponds to the frequency at which no critical power consumption or thermal limits are exceeded under most real workloads.

A problem is that the processor can support multiple different configurations, and, the P1 frequency that is stamped on the device only assumes one of these. A typical processor has interfaces not only to system memory but also to I/O. For example, a typical processor may have M system memory links and N I/O links Each link may also have its own associated, configurable speed (e.g., as a function of the operating frequency of the processor). Processors designed to support multi-processor implementations may also have additional links to support data consistency processor to processor (chip-to-chip) interconnections. Such processors are typically multi-core processors, and, these additional links serve as off-chip core-to-core or core-to-multicore communications (e.g., for MESI protocol data consistency communications, etc.).

More over, certain processors may include specialized hardware, e.g., one or more "accelerators", that perform specific, often numerically intensive functions so that these same functions need not be implemented with (e.g.,) hundreds of instructions executed on a general purpose core. The accelerators are typically coupled to one or more general purpose processing cores on the same semiconductor die as the processing cores. Depending on processor architecture, accelerators may be dedicated to a specific core, or, multiple cores may share an accelerator. The specialized functions offered by accelerators, however, are not necessarily enabled depending on the application of the system that the processor is integrated within. For example, an accelerator designed to perform specific complex financial calculations will probably not be enabled if the processor's larger system is not directed to a financial application.

To finalize the train of thought then, the actual power consumption of the processor for a given processor operating frequency can be significantly affected by the number of links that are enabled and the corresponding speed that is set for each link as well as the number of accelerators that are enabled for the processor for the specific applications that the processor is expected to process.

If the actual configuration of the processor is more power hungry than what was "assumed" for the determination of the P1 frequency, and, the system uses the P1 frequency that is stamped on the device as the processor frequency for the system's P1 performance state, the P1 frequency as implemented in all likelihood will cause the processor to exceed critical thresholds under the workloads it processes. Contrawise, if the actual configuration of the processor is less power hungry than what was "assumed" for the determination of the P1 frequency, and, the system uses the P1 frequency that is stamped on the device as the processor frequency for the system's P1 performance state, the P1 frequency as implemented, in all likelihood, will cause the processor to operate well under a performance level it could otherwise acceptably operate at. As such, the effect that real workloads will have, whether approaching critical thresholds or even exceeding them, is not determinable pre runtime.

In the case of the P0 state, normally, the ACPI software is designed to permit the processor to exceed the P1 frequency provided that critical temperature and/or power consumption thresholds of the device are not exceeded. In this case, the ACPI decisions concerning when to bring the processor from the P1 state to the P0 state, when to bring the processor from the P0 state to the P1 state, and, what specific processor frequency to use during the P0 state are all run-time decisions made by the ACPI. The net problematic effect is similar to that discussed above for the P1 state. Namely, the true performance of the processor in the P0 performance state is indeterminable pre runtime.

Indeterminable processor performance levels can result in difficulties presented to system designers when trying to guarantee or otherwise specify the actual performance levels of the system itself.

As such, an approach is disclosed herein in which substantially more information is provided about the device concerning appropriate operating frequencies for specific configurations. Specifically, in an embodiment for an ACPI system, a P1 frequency is provided for each of a number of different configurations of the device. Said another way, rather than—as in the prior art—having a single frequency being specified as being appropriate for a particular performance state, instead, multiple frequencies are specified for the device for a same performance state, where, a particular one of the specified frequencies is selected as appropriate based on, at least in part, the processor's configuration.

As such, when a specific configuration of the processor is established by the system designer, and/or, when a specific configuration of the processor is established in the field by the user after receiving the system from the system designer, an appropriate P1 frequency for that specific configuration may be found within BIOS firmware. The ACPI power management software can then use an appropriate "configuration-specific" P1 frequency to implement its power management scheme, e.g., at least for the P1 and P0 states, that is much better tuned to the specific system than what would have otherwise been specified with the prior art approach.

FIG. 1 shows an embodiment of the various kinds of information 100 that may be made available to power management software for effecting more determinable processor performance levels. As observed in the embodiment of FIG. 1, there is a specified P1 frequency for each of: i) different accelerator enablement/disablement combinations 101; ii) different enabled/disabled processing core combinations 102; iii) different enabled/disabled memory interface combinations 103; iv) different memory interface speeds 104; v) different enabled/disabled I/O link combinations 105; vi) different I/O link interface speeds 106; vii) different combinations of enabled/disabled inter-core off chip communication links 107; and, viii) different speeds of such links 108.

Here, each entry of field 101 corresponds to a different combination of enabled/disabled accelerators. For example, if a processor has four accelerators A, B, C, D, a first entry may correspond to all four accelerators being enabled, a second entry may correspond to all accelerators except accelerator A being enabled, etc. through every other possible combination (one entry per combination) including all accelerators being disabled. A similar explanation can be provided for each of fields 102-108. In the case of the interface speeds, there may be a different speed entry for each different speed supported by the interface.

Although not depicted in FIG. 1 specifically, additional entries can be listed for any enabled hardware feature (such as a core, accelerator or interface) based on the expected usage or workload of the enabled feature. For example, in a first system an accelerator is enabled and is expected to be heavily utilized (e.g., an accelerator to assist complex financial calculations in a system that will frequently performs financial calculations), while, in a second system another instance of the same accelerator is enabled but is not expected to be heavily utilized (e.g., because the second system will infrequently perform financial calculations). Here, two entries may be listed for the same "enabled" accelerator: one for high usage and another for low usage. The degree of granularity may vary from embodiment to embodiment and from feature to feature (e.g., high/medium/low for one feature and high/low for another feature). As such, entries may be listed based on expected usage case rather than just enablement/disablement, for example. The remainder of the discussion refers to configuration and enablement/disablement for convenience, the reader should understand the following discussion is also applicable to usage case as appropriate.

FIG. 1 also shows that different P1 frequencies may be achievable for each configuration as a function of ambient temperature 109. Specifically, for a particular configuration/entry, a higher P1 frequency may be established if the die can be kept cooler. So, for example, columns 109_1, 109_2 and 109_3 may correspond to three different temperatures T1>T2>T3. As such, for a same entry, the frequency in column 109_3 is higher than the frequency in column 109_2, and, the frequency in column 109_2 is higher than the frequency in column 109_1.

The P1 frequencies that vary as a function of temperature for a same configuration may be made available, for instance, to provide for the different kinds of cooling systems that may exist within the different kinds of systems that the processor may be designed into. For example, column 109_3 may be more appropriate for systems having high end cooling (and can therefore keep die temperatures down near T3), while, column 109_1 may be more appropriate for systems having low end cooling (which can only keep die temperatures down to T1 (where T1>T3)).

The format of FIG. 1 suggests an entry for each conceivable configuration of the processor. In this case, at least one specific appropriate P1 frequency is presented for each such configuration. Again, the P1 frequency represents the frequency at which no critical power consumption or thermal limits are exceeded under most real workloads. In the case of the accelerator based configurations 101, the real workload may assume the existence of work directed to an enabled accelerator.

Note that in various embodiments, various entries may be excluded. Even further, whole criteria (e.g., number of I/O links, I/O link speed, etc.) may be excluded. Those of ordinary skill will understand what particular configuration and/or environmental parameters may or may not be chosen for inclusion in the provided information.

Thus, as opposed to having only a single P1 frequency associated with the processor provided to the ACPI software, as in the prior art, instead, multiple P1 frequencies are provided to the ACPI software—each P1 frequency being an appropriate P1 frequency for a particular configuration combination (e.g., of accelerators, cores, interfaces and their associated speeds). The ACPI software utilizes, as the system's P1 frequency, the P1 frequency of the entry in information 100 that corresponds to the specific processor configuration (and temperature if columns 109 are implemented) that applies.

Figure 2:
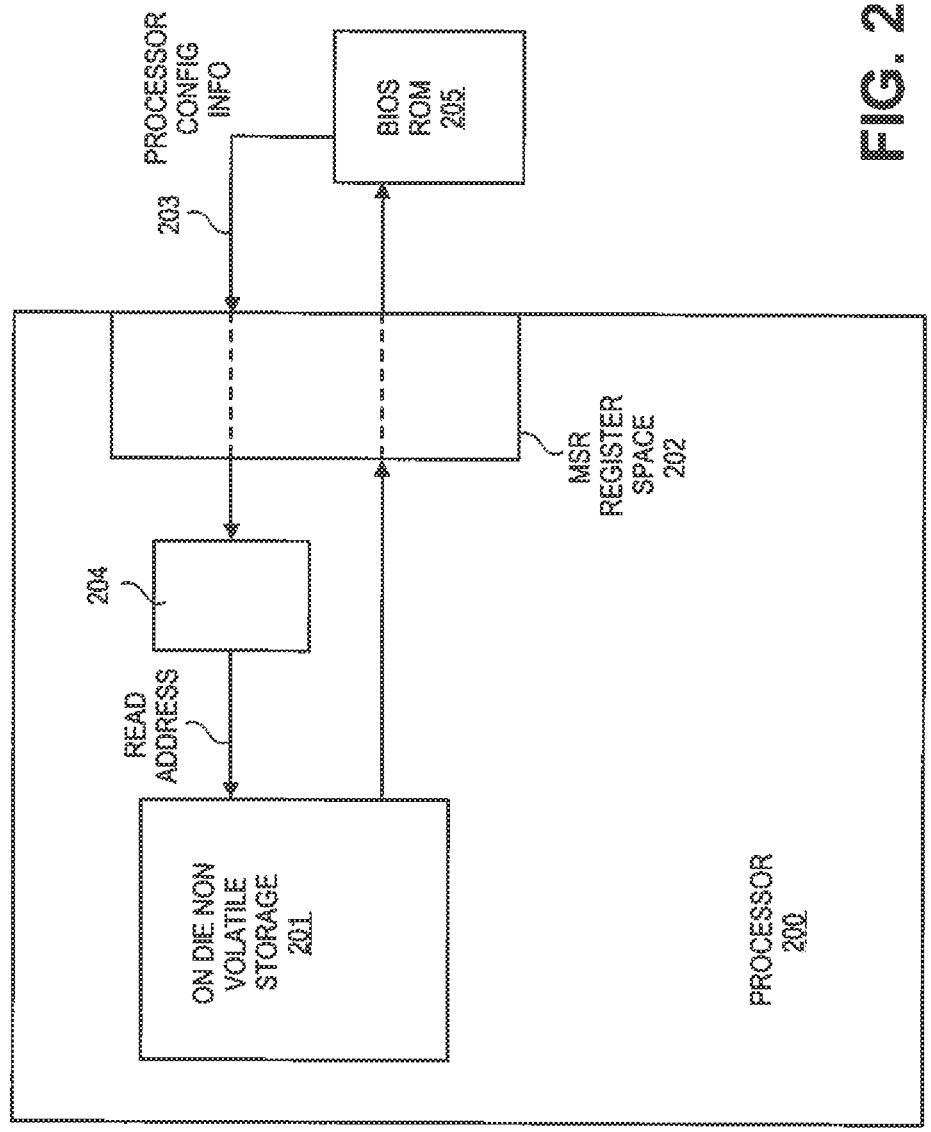
FIG. 2 shows mechanisms for accessing the information of FIG. 1.

FIG. 2 shows an embodiment for effecting the transfer of a P1 frequency n that is specific to the processor's configuration (and/or environmental setting) to the external BIOS and ACPI software. Here, recall that in the prior art, a single P1 frequency was stamped and the part, and, the value of the P1 frequency was incorporated into the BIOS firmware by the system manufacturer. With respect to the present teachings, however, there may be too many P1 frequency values to stamp on the part.

As such, in an embodiment, the frequency values are written into on-die non volatile storage (e.g., Read Only Memory (ROM)) 201 of the processor 200 (e.g., on die fuses are blown). Here, as each frequency is specific to the actual processor die 200, in an embodiment, the die is subjected to characterization testing by the die manufacturer. For example, the die's power consumption is measured as a function of frequency for the various possible configurations (and perhaps temperature) and an appropriate P1 frequency is determined for each such configuration (and temperature). The P1 frequency information is then written into non-volatile on die ROM 201 by the die manufacturer. The frequency information may be written into a location of the ROM that is designed to correspond to a specific configuration (and temperature), or, information identifying the specific configuration (and temperature) may also be stored in the ROM 201 and somehow correlated with the corresponding frequency information.

According to one embodiment, e.g., where P1 frequency information is stored in a location of ROM 201 that corresponds to a specific configuration, the specific configuration that the processor is setup with when integrated finally into the system is applied as an input to the die. For example, the processor's specific configuration within the system is written into a machine specific register 202 (MSR) as an input 203. Input 203 may be specifically for the purpose of reading power state frequency information as described in more detail below, or, may be input information that the processor uses to set its internal configuration, and, the determination of the appropriate power state frequency information "taps off of" this input.

ROM read circuitry 204 within the die 200 accepts this input information 203 and uses it to formulate a read address that is applied to the ROM 201 as part of a read operation. The ROM provides the P1 frequency information that is specific to the input configuration 203, and, the P1 frequency information is subsequently written into another location of the MSR register space.

With the appropriate P1 frequency information available in model specific register (MSR) space, it can now be read by BIOS firmware and/or ACPI power management software. The process of reading the ROM may occur with each new boot up of the system, in which case the input information 203 may be stored in an external non volatile ROM 204 (e.g., FLASH) that stores BIOS firmware that applies the input information 203 to the processor. Alternatively or in combination, the read of ROM 201 may be performed by the system manufacturer who then stores the appropriate P1 frequency information in the BIOS firmware of the system 204 which provides it directly to the ACPI software on each boot-up.

In other embodiments, the entire table of frequency information (e.g., all of the information of FIG. 1 stored in ROM 201), or a portion thereof beyond a single P1 frequency, is read out (e.g., through a serial interface 204 of the processor) either by firmware during boot-up, and/or, by the system manufacturer, and stored in the BIOS firmware 204. In this case, the entire table, or portion thereof beyond a single frequency, is kept in BIOS firmware 204 and made available to ACPI software.

Figure 3:
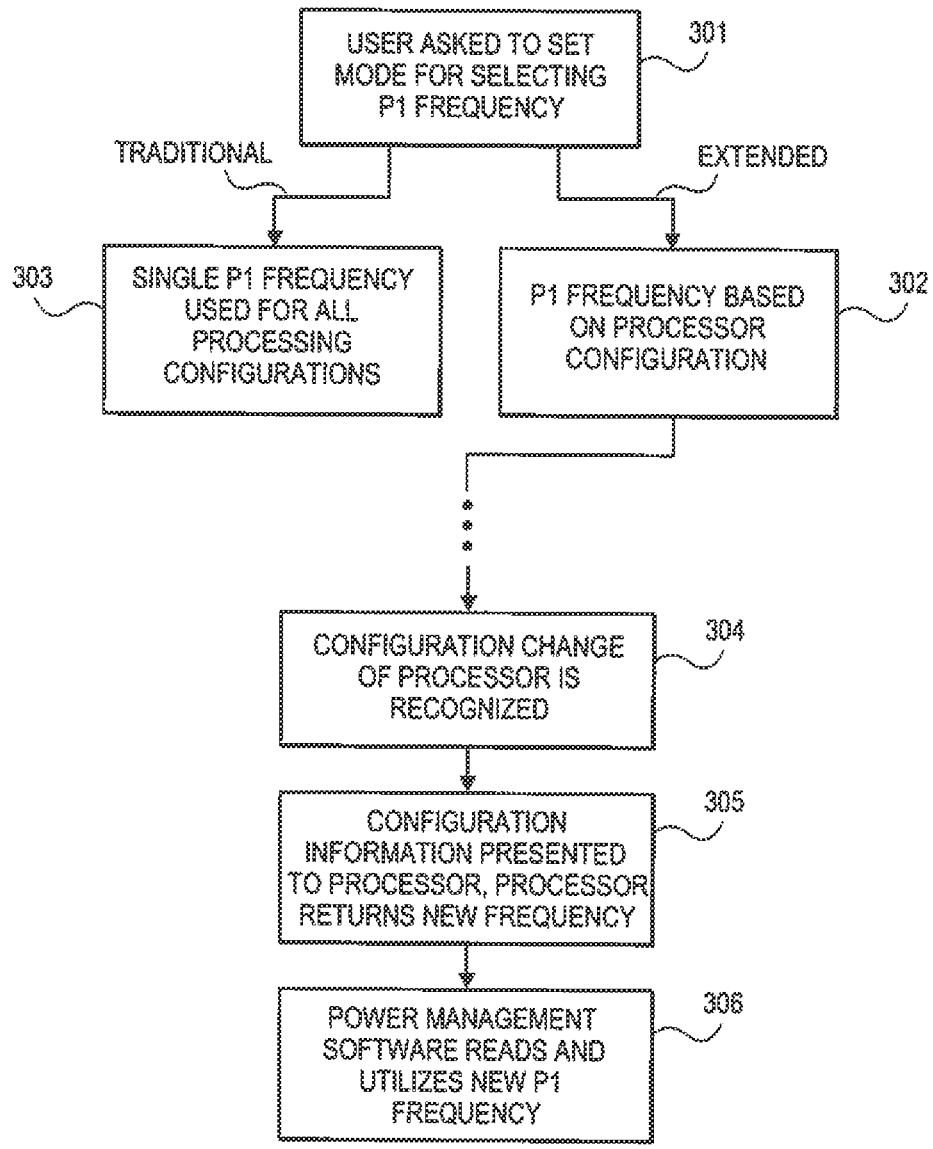
FIG. 3 shows a software power management process for using the information of FIG. 1.

FIG. 3 shows an embodiment of a process in which a user is permitted to decide whether the more specific P1 frequency information (such as the information illustrated in Table 1) is to be utilized or the standard P1 frequency information is to be utilized. Here, it is conceivable that although the discussions provided herein can be used to completely replace the single P1 frequency associated with the processor, in fact, both approaches can be supported and a user is provided the option of which to select. As such, as seen in FIG. 3, up a (e.g., initial) configuration sequence of a computing system, a user is asked 301 if the user prefers extended or traditional P1 frequency support.

If the user chooses extended P1 frequency support, the information within ROM 201 that was determined for the specific configuration of the processor may be extracted by any of the processes discussed above 302. In contrast, if the user chooses the traditional approach, the singular P1 frequency that is identified for the part regardless of its configuration is provided to the ACPI software. In this case, the singular P1 frequency may be provided directly from BIOS firmware as in prior art systems, or, may be read from on die ROM 201. If read from on-die ROM 201, the table 100 of FIG. 1 is extended to include an additional entry that corresponds to the traditionally determined P1 frequency, or, one of the entries/configurations of the table 100 of is presumed to correspond to such a value. Alternative to reading the traditional P1 frequency from on die ROM 201, the traditional P1 frequency may simply be stored in firmware BIOS 204 consistent with traditional approaches.

FIG. 3 also shows a downstream process after boot-up in which new P1 frequency information is retrieved from the on-die ROM in response to a configuration change of the processor. As observed in FIG. 3, a configuration change of the processor is detected or made aware to the ACPI software 304. The configuration change may be the result of, for example, a new memory module and/or I/O component that activates a previously inactivated link, the installation of new application software that utilizes a previously disabled accelerator which causes the enablement of the accelerator, etc.

In response to the notification of the configuration change, the ACPI software presents 304 the new processor configuration to the processor (e.g., in MSR register space) which reads the appropriate, new P1 frequency from its internal ROM 305 and presents the new P1 frequency as a response 306 (e.g., in other MSR register space). The ACPI software reads 307 the new P1 frequency that is made available by the processor and implements the new P1 frequency going forward with the new processor configuration 308.

The process just described above can be equally applied to expected usage changes apart from or in combination with configuration changes.

Although the above discussion has been primarily directed to discussing specific ACPI related examples focused on tabulating P1 performance state frequencies, one of ordinary skill, will recognize other embodiments need not be identically directed. To name just a few possibilities, frequencies for performance states other than P1 performance state frequencies, or even ACPI performance states may be provided. Even further, the stored information need not even be specific frequencies. That is, some other parameter may be specified to communicate the appropriate performance, speed and/or power consumption of the device.

For example, coefficients of a formula may be provided, where the formula accepts configuration input information (e.g., number of links of a specific type (e.g., I/O or memory) that are enabled, number of or which specific accelerators are enabled) and provides as an output an appropriate frequency. Further still, as another possibility, the stored information may be a numeric figure of merit that, when input to a formula or set of mathematical relationships, causes the formula(relationships) to produce an appropriate operational frequency. As just one example, the stored information may correspond to a specific entry in a look-up table maintained by the ACPI software and/or BIOS firmware.

Also, although embodiments described above have focused on implementations where the frequency information is stored on the processor die, conceivably this information could be provided to the system designer separately and stored in BIOS firmware or other storage of the system external to the processor die.

Figure 4:
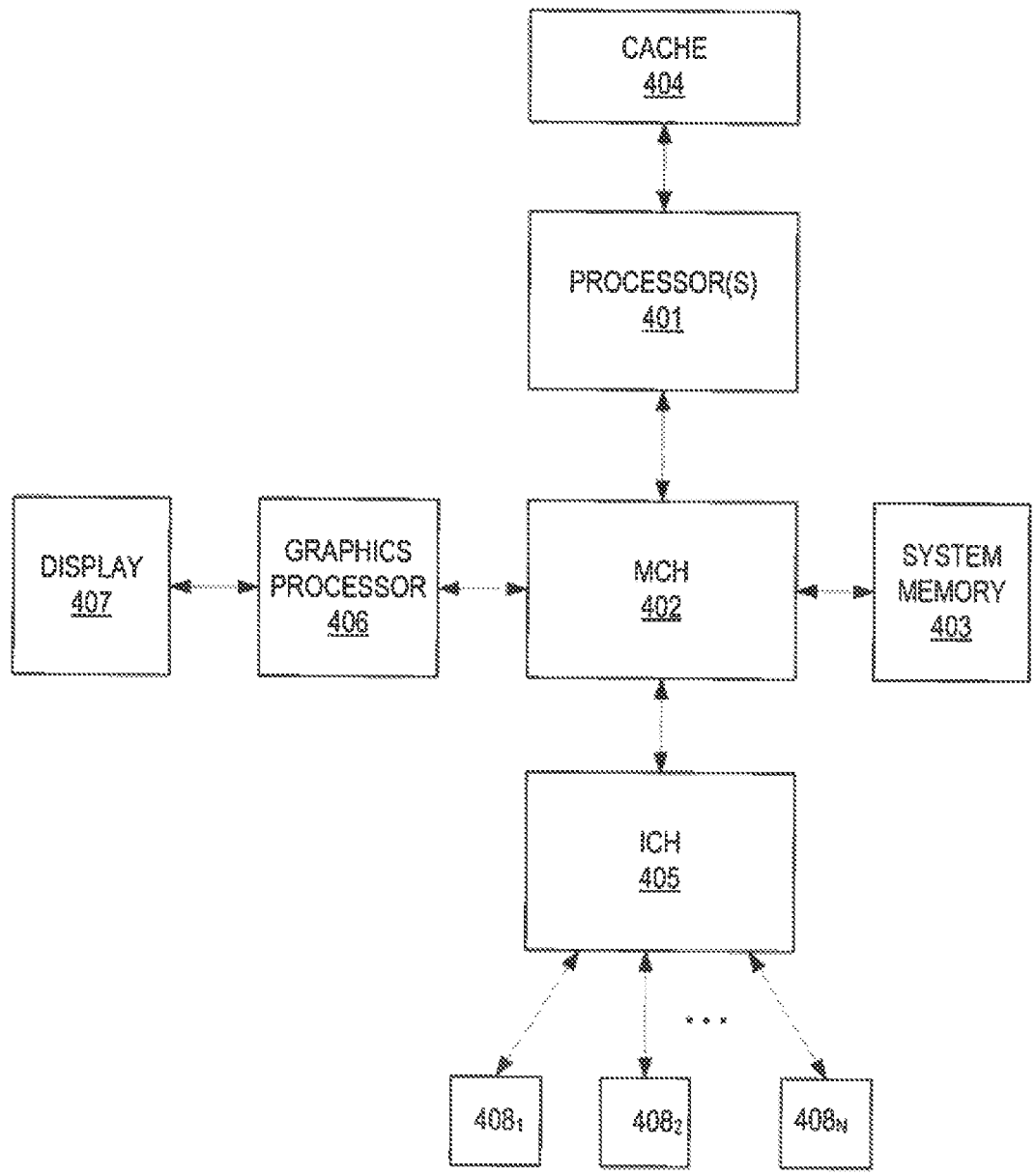
FIG. 4 shows an embodiment of a computing system.

A processing core having the functionality described above can be implemented into various computing systems as well. FIG. 4 shows an embodiment of a computing system (e.g., a computer). The exemplary computing system of includes: 1) one or more processing cores 401 that may be designed to include two and three register scalar integer and vector instruction execution; 2) a memory control hub (MCH) 402; 3) a system memory 403 (of which different types exist such as DDR RAM, EDO RAM, etc,); 4) a cache 404; 5) an I/O control hub (ICH) 405; 6) a graphics processor 406; 7) a display/screen 407 (of which different types exist such as Cathode Ray Tube (CRT), flat panel, Thin Film Transistor (TFT), Liquid Crystal Display (LCD), DPL, etc.) one or more I/O devices 408.

The one or more processing cores 401 execute instructions in order to perform whatever software routines the computing system implements. The instructions frequently involve some sort of operation performed upon data. Both data and instructions are stored in system memory 403 and cache 404. Cache 404 is typically designed to have shorter latency times than system memory 403. For example, cache 404 might be integrated onto the same silicon chip(s) as the processor(s) and/or constructed with faster SRAM cells whilst system memory 403 might be constructed with slower DRAM cells. By tending to store more frequently used instructions and data in the cache 404 as opposed to the system memory 403, the overall performance efficiency of the computing system improves.

System memory 403 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 403 prior to their being operated upon by the one or more processor(s) 401 in the implementation of a software program. Similarly, data that a software program determines should be sent from the computing system to an outside entity through one of the computing system interfaces, or stored into an internal storage element, is often temporarily queued in system memory 403 prior to its being transmitted or stored.

The ICH 405 is responsible for ensuring that such data is properly passed between the system memory 403 and its appropriate corresponding computing system interface (and internal storage device if the computing system is so designed). The MCH 402 is responsible for managing the various contending requests for system memory 403 access amongst the processor(s) 401, interfaces and internal storage elements that may proximately arise in time with respect to one another.

One or more I/O devices 408 are also implemented in a typical computing system. I/O devices generally are responsible for transferring data to and/or from the computing system (e.g., a networking adapter); or, for large scale nonvolatile storage within the computing system (e.g., hard disk drive). ICH 405 has bi-directional point-to-point links between itself and the observed I/O devices 408.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
   a semiconductor chip having a processor and on-die non-volatile storage, said on-die non-volatile storage to store different, performance related information for different configurations and expected usage cases of said processor for a same performance state of said processor.

2. The apparatus of claim 1 wherein said same performance state is a same ACPI performance state.

3. The apparatus of claim 2 wherein said same performance state is a P1 performance state.

4. The apparatus of claim 3 wherein said different, performance related information for different configurations of said processor comprises different P1 frequencies for different configurations of said processor.

5. The apparatus of claim 1 wherein said different configurations include a first configuration where an accelerator is enabled and a second configuration where said accelerator is disabled.

6. The apparatus of claim 1 wherein said different configurations include a first configuration where an interface to an I/O unit is enabled and a second configuration where said interface to said I/O unit is disabled.

7. The apparatus of claim 1 wherein said different configurations include a first configuration where an interface to a memory unit is enabled and a second configuration where said interface to said memory unit is disabled.

8. The apparatus of claim 1 wherein said on-die non-volatile storage also stores different, performance related information for different temperatures of said die.

9. A method comprising:
   detecting a configuration change or an expected usage change to a processor;
   retrieving information from storage of different, performance related information for different configurations and expected usage cases of said processor for a same performance state of said processor to establish an operating frequency of said processor for the same performance state of said processor in view of said configuration change or said expected usage change; and
   causing said operating frequency to be applied to said processor while said processor is in the same performance state.

10. The method of claim 9 wherein the same performance state is a P1 performance state of an ACPI power management scheme.

11. The method of claim 9 wherein said configuration change identifies whether an accelerator is disabled or enabled.

12. The method of claim 9 wherein said configuration change identifies whether an interface is disabled or enabled.

13. The method of claim 12 wherein said configuration change identifies a speed of said interface.

14. The method of claim 12 wherein said interface is one of:
   a memory interface; and
   an I/O interface.

15. A non-transitory computer readable medium storing program code that when processed by a computer causes said computer to perform a method, said method comprising:
   detecting a configuration change or an expected usage change to a processor;
   retrieving information from storage of different, performance related information for different configurations and expected usage cases of said processor for a same performance state of said processor to establish an operating frequency of said processor for the same performance state of said processor in view of said configuration change or said expected usage change; and
   causing said operating frequency to be applied to said processor while said processor is in the same performance state.

16. The non-transitory computer readable medium of claim 15 wherein the same performance state is an ACPI P1 performance state.

17. The non-transitory computer readable medium of claim 15 wherein said configuration change includes any of:
   enabling or disabling an accelerator; and
   enabling or disabling an interface to said processor.

18. The non-transitory computer readable medium of claim 15 wherein,
   said change includes enabling an interface to said processor, and
   said information further specifies a speed of said interface.

19. The method of claim 9 wherein the same performance state is a same performance state of an ACPI power management scheme.

20. The method of claim 9 wherein said information is a frequency of said processor.

* * * * *